(12) United States Patent
Petering

(10) Patent No.: US 7,060,186 B2
(45) Date of Patent: Jun. 13, 2006

(54) METHOD AND APPARATUS FOR THE TREATMENT OF WASTEWATER

(76) Inventor: John L. Petering, 1325 Pennsylvania Ave., St. Louis Park, MN (US) 55246

( * ) Notice: Subject to any disclaimer, the term of this patent is extended or adjusted under 35 U.S.C. 154(b) by 13 days.

(21) Appl. No.: 10/896,696

(22) Filed: Jul. 22, 2004

(65) Prior Publication Data

US 2005/0056588 A1 Mar. 17, 2005

Related U.S. Application Data

(60) Provisional application No. 60/489,700, filed on Jul. 24, 2003.

(51) Int. Cl.
*C02F 3/30* (2006.01)

(52) U.S. Cl. ...................... 210/605; 210/630; 210/259; 210/903; 210/921

(58) Field of Classification Search ................ 210/604, 210/605, 620, 621, 629, 630, 195.1, 218, 210/252, 258, 259, 903, 921
See application file for complete search history.

(56) References Cited

U.S. PATENT DOCUMENTS

| | | | |
|---|---|---|---|
| 3,939,068 A * | 2/1976 | Wendt et al. ................ | 210/605 |
| 3,973,043 A * | 8/1976 | Lynn ............................ | 426/55 |
| RE29,781 E * | 9/1978 | McWhirter ................... | 210/604 |
| 4,163,712 A | 8/1979 | Smith | |
| 4,645,603 A | 2/1987 | Frankl | |
| 4,999,111 A | 3/1991 | Williamson | |
| 5,167,806 A * | 12/1992 | Wang et al. ................ | 210/188 |
| 5,545,326 A | 8/1996 | Petering | |
| 6,413,427 B1 * | 7/2002 | Tipton et al. ............... | 210/605 |
| 2002/0104798 A1 * | 8/2002 | Takechi et al. ............. | 210/605 |
| 2002/0117444 A1 * | 8/2002 | Mikkelson et al. ......... | 210/605 |
| 2002/0162795 A1 * | 11/2002 | Pollock ....................... | 210/621 |
| 2003/0080055 A1 * | 5/2003 | Gross .......................... | 210/620 |

FOREIGN PATENT DOCUMENTS

JP 10-211499 * 8/1998

* cited by examiner

Primary Examiner—Fred G. Prince
(74) Attorney, Agent, or Firm—Nikolai & Mersereau, PA; C. G. Mersereau

(57) ABSTRACT

A batch process and apparatus for treating wastewater in a system employing anaerobic and aerobic zone reaction vessels under elevated pressure is disclosed in which an amount of processed activated sludge material is charged into an aerobic zone and wastewater to be processed from an inlet supply charge system is used to fill one or more aerobic zones. The charge system is pressurized by introducing high pressure air which is continuously infused and the material is circulated among anaerobic and aerobic zones as a multi-phase bubble flow while venting an amount of circulated air of lower oxygen content through a vapor release system. After treatment, the system pressure is reduced over a timed interval through the vapor release system, and the treated batch is discharged to an effluent storage system for separation of treated water and sludge.

20 Claims, 3 Drawing Sheets

METHOD AND APPARATUS FOR THE TREATMENT OF WASTEWATER

BACKGROUND OF THE INVENTION

The present application claims priority based on provisional application No. 60/489,700, filed Jul. 24, 2003, which is hereby incorporated herein by reference in its entirety.

I. Field of the Invention

The present invention is directed generally to improvements in the treatment of aqueous wastewater streams having a content of organic matter such as are collected by municipal sewage systems and, more particularly, to a process which quickly and economically reduces the biological oxygen demand (BOD) in such wastewater to a safe level for discharge back into the environment.

II. Related Art

Wastewater treatment has been and continues to be a matter of great environmental importance. This includes, for example, chemical containing effluents from industrial operations, municipal sewage treatment and treatment of waste from operations producing concentrated animal waste. Traditionally, organic matter containing more than an acceptable or permitted amount of BOD has been treated using microbial action in a manner that includes separation of the organic matter to form a mass of solids known as an activated sludge, with the remaining material making up a water fraction. The treatment problem then becomes decidedly two-fold because the water and sludge fractions both must be treated to be safely returned to the environment and the two fractions may contain different impurities to be removed necessitating different processing.

Treatment typically involves digestion of the dissolved organic material through fermentation of the sludge involving aerobic or anaerobic bacterial action or some combination thereof. These processes are used to reduce or consume the biological oxygen demand (BOD) of the material to an environmentally safe level in the discharged materials. It is also necessary to remove certain undesirable inorganic materials from the water fraction which typically contains undesirable quantities of phosphates and nitrogen compounds including phosphates and ammonia-related compounds.

Systems have been proposed for the aerobic treatment of liquid borne biowastes in which the oxygen potential has been enriched or elevated above that which normally dissolves in the liquid at atmospheric pressure. Such a system is illustrated in U.S. Pat. No. 4,163,712 to Smith in which the gas is introduced into an inlet stream under pressure and turbulent conditions to produce an input stream containing oxygens in amounts greatly in excess of the equilibrium saturation value, the excess forming finely divided bubbles therein. The stream is introduced at or near the bottom of a non-pressurized main biomass allowing the undissolved gas to bubble through the main mass when the pressure is released and to dissolve in the main body of liquid as it rises. This serves to increase the general level of oxygenation in the main reactive biomass, however, in order for such a system to be practical, the oxygen-containing gas mixture needs to have an enriched oxygen content (i.e., greater than that of air) and preferably a composition close to pure oxygen. This, of course, adds greatly to the expense of operating the system inasmuch as it requires a continuous source of liquid oxygen or equivalent to produce the highly enriched air.

Another system which bubbles air through the depth of the biomass is illustrated in U.S. Pat. No. 4,645,603 to Franco in which the air is supplied from an open-ended mixing tube at a pressure slightly above the pressure of the hydraulic head of the tank to be aerated and released to bubble through the reacting biomass.

Additionally, systems and methods have been devised for anaerobically treating wastewater to remove phosphorous and phosphorous-consuming micro-organisms. One such system is shown in U.S. Pat. No. 4,999,111 to Williamson which deals with the removal of phosphates and nitrogen, particularly from wastewater of relatively low BOD to P ratio using both oxic and anoxic zones in which nitrogen, phosphorous and other pollutants are removed. The process requires a fraction of the primary sludge to be fermented to soluble organics to provide significant nutrients to sustain the phosphorous consuming and denitrification systems.

U.S. Pat. No. 5,545,326 to Petering, the inventor in the present application, describes a relatively high pressure process for the treatment of relatively high-solids wastewater having high BOD and phosphorous content which includes both anaerobic and aerobic treatment. That process involves introducing material to be treated at relatively high pressure and processing the material in a closed system prior to rapidly venting the elevated pressure and discharging to atmospheric pressure. That process is more specifically directed to processing wastewater streams of relatively high solids and high BOD content in which phosphorous is removed by being transferred from the liquid to the solid fraction.

Another problem with existing municipal sewage treatment facilities which must handle large volumes of wastewater lies in the fact that they require large, level land areas, sometimes many acres, to accomplish the aeration and separation required to return treated wastewater to the environment. Furthermore, these large sewage treatment facilities are extremely expensive to build, operate and maintain.

Accordingly, there remains a need for a relatively compact, low-cost, high-volume processing system that can return treated wastewater to the environment in a relatively short time. Such a compact system could be employed to treat wastewater on a more local basis as a much smaller site would be required. Modular system units could be added as local demand increased.

SUMMARY OF THE INVENTION

By means of the present invention, there is provided a process and apparatus for the treatment of wastewater which is particularly suited to treat high volumes of relatively dilute material. This highly efficient system uses a bubble flow technique in which air is continually infused into a recycle stream of reacting material that is continually moving serially through the aerobic or oxidizing treatment vessels or zones and used to establish a bubble flow, plug flow continuous stirred tank reactor (CSTR) environment under elevated pressure (preferably 3–10 atmospheres).

The bubble flow continuously circulates as a recycle stream through the aerobic zones or reactors and intermittently through a parallel anaerobic zone or reactor which is initially charged with activated sludge (activated sludge is sludge older than five days, the average sludge age being the average residual time in storage or the mass of sludge under aeration treatment, divided by the rate of sludge removal) thereby purging the sludge so that the entire biomass is mixed and circulated and treated using fine bubbles of compressed air the supply of which is continually renewed by the compressor and vented from the system as spent air after being cycled through the system. This insures that large amounts of high oxygen content air continuously contact the material in the system which itself is circulated in a generally plug flow pattern. The combination of venting and continuous infusion of high pressure air further enables the bio-reduction of nitrogen from the system by converting nitrogen contained in ammonia, or the like, into nitrites in the aerobic zone and into nitrates (aerobicly) which can be nitrogen stripped, in which the $NO_x$ are reduced to $N_2$ anaerobically, and the $N_2$ is vented.

The process and apparatus are decidedly designed for sequential batch processing in which one or more anaerobic zones or reactors are first charged with aged activated sludge from nearby sludge storage and the remainder of the system including all aerobic reactors or zones are then charged with quantities of fresh wastewater, from an accumulating supply of that material as in a surge tank. As the system is filled, air is displaced and vented, or removed by vacuum, and almost the entire closed system is charged with liquid and solid phases leaving very little remaining air space.

Once the system is charged with material, the input valve and vent valve are closed and the system is pressurized, preferably using an air compressor which infuses air into the system and, owing to the small remaining head space, quickly pressurizes the system to the desired level. At this point, circulation begins and air is continually infused and vented with the system operating at the desired elevated pressure. The elevated pressure and continuous flow insure that the bubbles flowing in the system will remain small and the amount of available oxygen will remain in a supersaturated condition throughout aerobic processing. Air is infused into the zones or vessels continually at the bottom and is discharged from the top.

Entrance and exit energy losses in the interconnecting piping re-turbulate the bubbles into smaller diameters. Extending the flow path length of the bubble increases the time that the bubble surface exists in the liquid. This increases the time that the bubble transports $O_2$, and decreases the $O_2$ concentration in the air. $O_2$ levels of 5–10% $O_2$ are easily achieved and maintained in the process.

Processing that normally takes days under atmospheric pressure in large aeration ponds can be accomplished in as little as two or three hours using the system of the invention. Normal processing time for dilute wastewater is about 3–6 hours. The processing unit takes up very little space and reduces the land area needed for sewage treatment. The ratio of activated sludge to process wastewater material is normally in the order of from 1:1 to 1:15 and a preferred operating pressure is in the range of about 4–8 atmospheres.

The venting system further includes a vent valve which can be operated to vent in a manner that maintains a desired operating pressure range or can be opened to atmospheric as during the charging and discharging portions of the cycle. The system further separates the liquid and vapor fractions in a manner that allows recirculation of the liquid through the system. The volumetric content of air in the circulating stream is generally from 1% to 15%.

According to an aspect of the invention, the system pressure is preferably reduced slowly (gradually) after batch processing. Once the batch has been processed to the desired discharge BOD level, which can be known with a degree of accuracy from the average BOD level of the feed stock, pressure is reduced over a period of time. The air supply is reduced proportionally as the vapor release system is utilized to ramp down or slowly reduce the system pressure at a rate of possibly 1–2 atmospheres per minute to ambient. This further enhances nitrogen stripping and enables entrapped vapors to escape without producing undesirable amounts of foaming or floatation in the material. Once the system has reached atmospheric pressure, the system can be emptied by gravity or pumping into an effluent surge tank from which it is continually moved at a slow rate into a concentrator or clarifier tank containing a discharge or overflow weir. The concentrator is preferably center midway fed from the effluent surge tank and sludge buildup in the bottom of the concentrator can be removed to the environment or recycled to sludge storage for use in future processing batches.

It should be noted that the aerobic and anaerobic treatment can occur in a single vessel by controlling the air supplied to it. Thus, by periodically shutting off the air to the aerobic zone, an anaerobic phase may be created when the oxygen depletes.

BRIEF DESCRIPTION OF THE DRAWINGS

In the drawings wherein like numerals depict like parts throughout the same.

DETAILED DESCRIPTION

Figure 1:
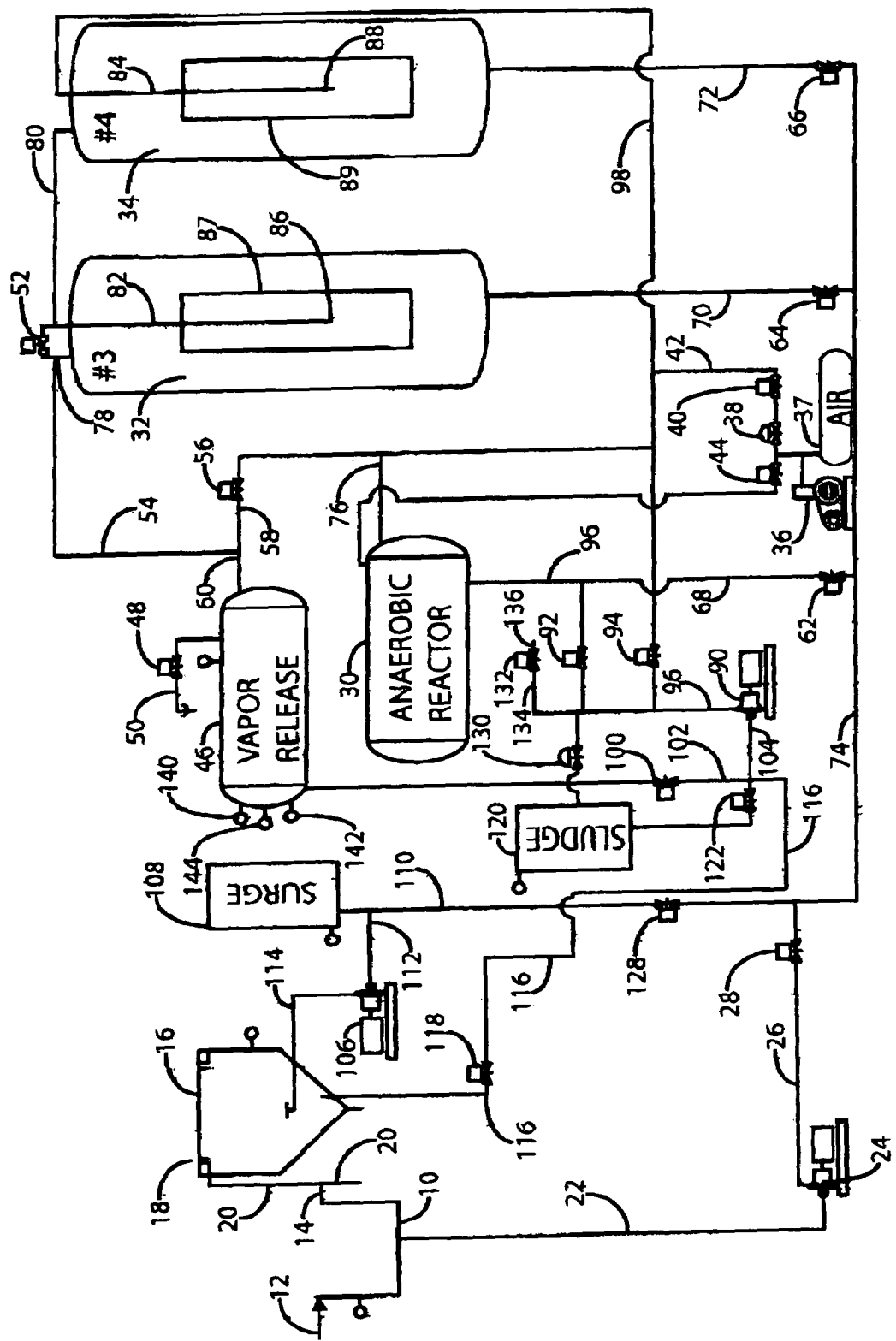
FIG. 1 is a elevational view of a schematic representation of a possible detailed embodiment of a system for performing the process of the invention.

One specific example of a wastewater treatment facility which may be used to perform the wastewater treatment process of the invention is depicted in the drawing figures. The detailed embodiment illustrated and described herein is offered as an example and is not meant to be limiting with respect to the scope of either the process or the apparatus for performing the process of the invention. For example, a particular operation may be performed in a plurality of connected vessels or several zones in a single vessel.

The present system is decidedly a sequentially charged batch reactor process which utilizes the concepts of continuous stirred tank reactors and plug flow recycling. Depending on the wastewater material processed, the process includes a process reaction residence time between charge and discharge that is typically generally 3–6 hours, but may be as short as less than 2 hours and as long as 8 hours or more. A general range is about 2 hours to about 8 hours. Once charged, the system is designed to be pressurized and to operate under relatively high pressures (3–10 ATM) during the processing of a batch. The system is designed for batches to be charged or filled and discharged at ordinary ambient pressure and discharge is designed to occur after air stripping during a gradual pressure reduction step.

Figure 2:
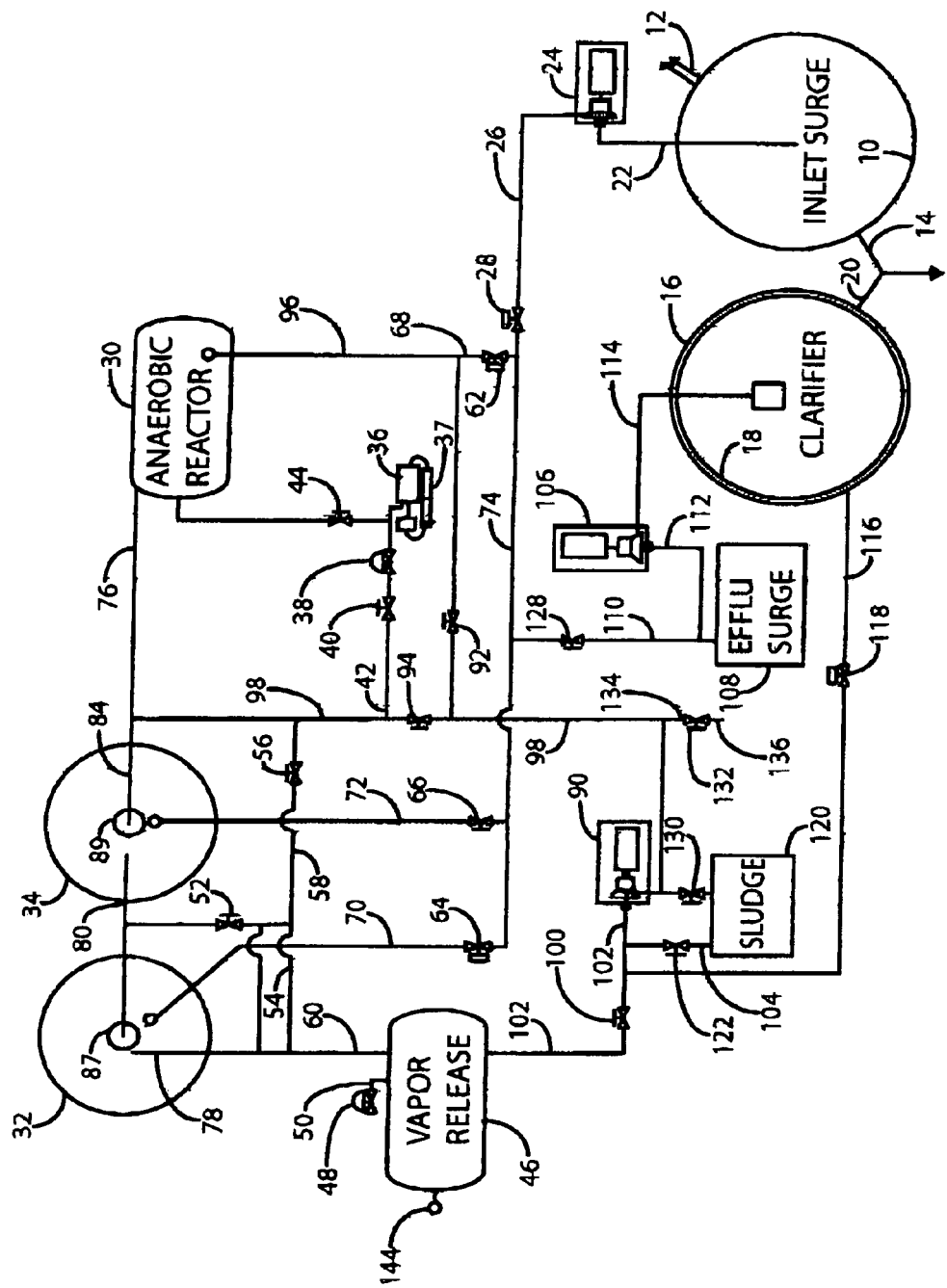
FIG. 2 is a top or plan view of a schematic representation of the embodiment shown in FIG. 1.
Figure 3:
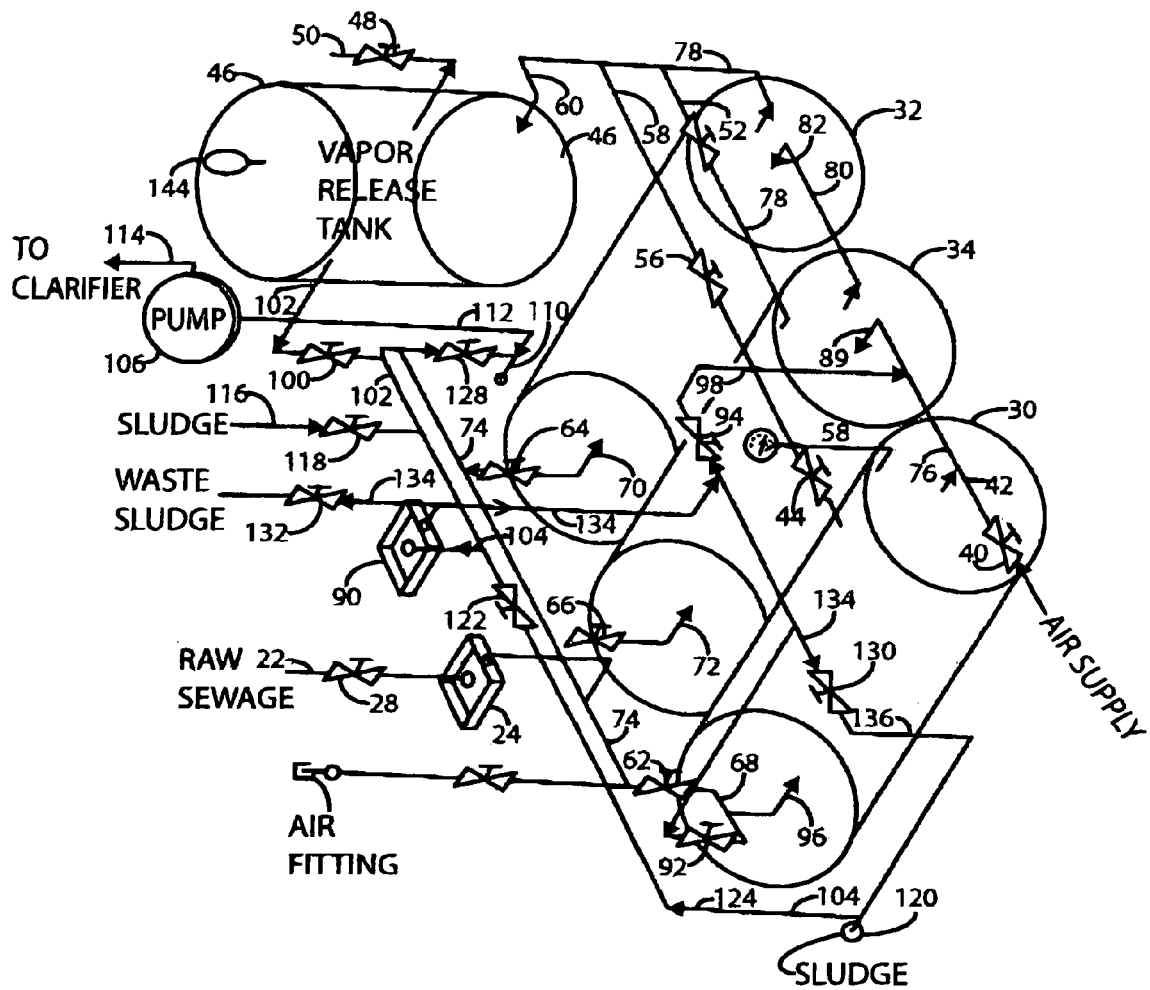
FIG. 3 is a perspective schematic view of the system of FIGS. 1 and 2.

FIGS. 1–3 depict a suitable apparatus for performing wastewater treatment in accordance with the invention. The processing apparatus is connected to a wastewater inlet tank 10 which accumulates wastewater from a supply line 12 which may be a community or neighborhood sewage system discharge pipe or other source of wastewater to be treated and includes an overflow outlet 14 which connects to a treated water effluent line 20 which normally discharges treated water from a main clarifier or concentrator 16 through an overflow discharge weir system 18 and discharge line 20. An after filter to "polish" the waste to very low concentration of solids can be added, as well as chlorination facility for disinfection in a well-known manner. These are of known construction.

Normal discharge from the wastewater inlet surge tank 10 is into the treatment system through raw influent feed line 22 which connects to the suction side of the primary input or feed pump 24, which may be a chopper pump. Output line 26 from pump 24 is suitably valved at 28 and supplies raw influent wastewater to charge the wastewater portion of the batch.

The wastewater inlet surge tank 10 should be sized so that it can accommodate all the flow input from the wastewater system to be treated except in emergency situations. Of course, a large surge tank could be connected to a plurality of processing systems. Also, the reaction or residence time could be reduced to accommodate more influent at slightly less treatment effectiveness. The input or feed pump 24 is preferably a chopper pump of relatively high flow volume to expedite the filling or charging of the system.

The pressurized portion of the system further includes a plurality of reaction vessels including at least one anaerobic reaction vessel 30 and a plurality of aerobic reaction vessels as at 32 and 34. Any arrangement is permissible so long as the aerobic volume or time, etc., is large compared to the anaerobic volume or time of exposure to anaerobic conditions, etc. The pressurization system includes an air compressor 36 with accumulator 37 and flow metering air control input valve 38 and a shutoff valve 40 in input line 42. A water hammer prevention valve is shown at 44. A vapor venting discharge system is provided that includes a vapor release tank as shown at 46 with associated air vent release orifice valve 48 in vent line 50. A further air vent release bypass valve 52 is provided in line 54 to vent the system vessels 32 and 34 through line 60 and a further vent valve 56 is provided in line 58 to vent vessel 30 through lines 58 and 60. The vessels 30, 32 and 34 are designed to be bottom filled and bottom emptied through valves 62, 64 and 66 provided in lines 68, 70 and 72, respectively, fed by lines 26 and drained by line 74.

Top fed overflow/recycle outlet lines 76, 78 and 80 are respectively associated with reactor vessels 30, 32 and 34 which provide for a continuous stirred tank reactor plug flow system during operation. Recirculation lines 82 and 84 are provided with corresponding input deflectors 86 and 88 located in central cylinder or jet tubes as at 87 and 89 in vessels 32 and 34. The system further includes a recirculation pump 90 with associated recycle and bypass valves to anaerobic reactor vessel 30 at 92 and 94 in lines 96 and 98, respectively. Pump 90 has a suction side connected to a bottom liquid/solid discharge from vapor release tank 46 through valve 100 and line 102 and a further sludge suction feed input line is shown at 104. The processed batch includes liquid and solid (as activated sludge) fractions and is discharged from the system utilizing discharge/recycle pump 90 and an effluent surge tank 108. The material from effluent surge tank 108 is further slowly, continually pumped by pump 106 into clarifier 16 via lines 110, 112 and 114, line 110 serving also as the input line for the bottom discharged effluent surge tank.

Sludge from concentrator/clarifier 16 is drawn off the bottom of concentrator/clarifier 16 in the line 116 where it may be recycled to the processing system in reactor 30 via valve 118 or stored in sludge tank 120 via valve 122 in line 104. Sludge may also be recovered from effluent storage tank 120 utilizing recycle return valve 128 and sludge storage tank valve 130. Finally, processed sludge is also discharged from the treatment facility using valve 132 and lines 134 and 136.

In conjunction with the vapor release tank, a liquid level system is provided that includes a high level sensor 140, a low level sensor 142 and a control level sensor at 144.

The operation of the system of the detailed embodiment will next be discussed beginning after a batch has been run and the closed portion of the system is empty but with the connected open items including the wastewater inlet surge tank 10, concentrator/clarifier 16, effluent surge tank 108 and sludge storage tank containing the material indicated in a running condition. Each cycle begins with batch-wise loading steps. Each cycle requires an amount of processed activated sludge as part of the charge.

The sludge that is recycled should have an age of at least five days to sustain nitrobacteria and nitrosomonas that enable the system to convert the unincorporated ammonia ($NH_3$) into nitrites ($NO_2$). The nitrite is later converted to nitrate ($NO_3$) and nitrogen ($N_2$) is stripped and released by the continuous alternating anaerobic and aerobic action that occurs during processing the wastewater. This enables the process of the invention to remove 80–90% of the combined $N_2$ if it incorporates 5–50 passes through the anoxic/anaerobic reactor or zone during the processing of a batch.

The recycled activated sludge is normally charged first and used to fill or partially fill the anaerobic reactor 30 from the sludge storage facility at 120 through valve 122 initially (earlier) supplied from the bottom of the concentrator through valve 118. During the charging of the reactor 30, valves 100, 92 and 56 are open and charging material is pumped using recirculation pump 90 to pump the desired amount of sludge into the reactor 30 as displaced air exits through vapor release valve 48 via lines 60, 58 and 76 through open valve 56. When the desired amount of sludge is charged into the vessel 30, valve 122 is closed and the system is ready to be charged with raw wastewater. Valve 28 is opened and if it is desired to add wastewater feed stock to tank 30, it is admitted to the reactor 30 through valve 62 in line 68 utilizing the input or feed pump 24. The filling of tank 30 may be indicated by a level indicator/control in the tank (not shown) or by overflow in line 76 proceeding to the vapor release tank through valve 56 thereby raising the liquid level in the vapor release tank 46 to the desired level 144.

At this point, valves 56 and 62 are closed and valves 64 and 66 are opened allowing fresh wastewater to charge reactor vessels 32 and 34 with displaced air being vented through valve 52 to the vapor release tank 46. Once the reactors 32 and 34 are filled as indicated by the liquid level indicators in vapor release tank 46, valves 28, 64, 66 close and the feed pump 24 is shut down. Pump 90 is started and compressor 36 is turned on to pressurize the system with outside air to a pressure of between 3 and 10 atm and preferably 5–7 atm and is infused into the system at a pressure regulated by valve 38 and metered at valve 40. Once pressurized, then regulator valve 48 is utilized to vent sufficient circulated air to maintain system pressure.

Because the system is essentially filled to begin with, pressurization is relatively quick and simple and infused air soon creates a bubbled flow pattern throughout the system utilizing pump 90. This accomplished by alternately opening and closing valves 94 and 92 to process the batch of material. With valve 94 open and valve 92 closed, air is infused into the recirculation stream in line 98 creating a bubble flow which proceeds through line 84 into aerobic reactor 34 at deflector 88 in central cylinder or jet tube 89.

Deflected bubble flow infuses oxygen throughout the reactor 34 with overflow entering top feed line 80 proceeding in like fashion to bubble flow deflector 86 in jet tube 87 in reactor 32. The flow from reactor 32 likewise proceeds sequentially through lines 78, 54 and 60 into the vapor release tank where the liquid and solid portions recirculate through valve 100 and the excess spent air is vented at 48, 50. It should further be noted that should it be desired, a vapor scrubber, perhaps using dilute phosphoric acid, might be employed at the outlet 50.

Periodically, valve 94 is closed and valve 92 is opened thereby purging and also recirculating the contents of anaerobic reactor 30 in addition to the contents of reactors 32 and 34. In this manner, material from reactor vessel 30 overflows in line 76 which connects to line 98 is recirculated through reactors 34 and 32 mixing with the contents thereof.

The oxygen transfer rate is well documented and known to those skilled in the art by mass transport equations in three-phase flow models of flow characteristics. The recycle or circulation rate is sufficient to maintain bubble phase flow, the liquid filling the stream containing less than about 15% of the volumetric flow as vapor bubbles. The bubble size is predicted by shear rate correlations which technique has been found to be very efficient.

According to the present process, over 50% of the $O_2$ in the air is depleted prior to venting. By controlling the time the bubble is in the liquid, even this can be increased if desired in the process of the invention. Prior low pressure conventional technology utilizes only about 8–25% of the available oxygen. A dramatic increase in oxygen utilization presents an advantage as it reduces the amount of air that needs to be infused into the system and thereby reduces the power requirements of operating the batch process. Also, the jet tubes 87 and 89 in the reactors 32 and 34 increase the circulation and transfer effluents and insure that no zone in the reactors becomes anoxic. Flow velocity should be such that the reactors 32 and 34 are maintained as continuous stirred tank reactors utilizing bottom feed, top discharge plug flow.

It is noted that each time a bubble rises in elevation inside the pressurized reactor in accordance with the invention, the diameter is controlled to change in the range of only 5–10% as opposed to an expansion of 50% in conventional reactors. The exit flow from one reactor returbulates the bubble size back to the original size before entering the next reactor. By entering and emptying the bottom of the reactor tanks and other tanks in the system, collected sludge is pushed through the system into the concentrator as the BOD concentration is reduced after a batch is processed.

Whereas one processing operation is sufficient for low BOD concentration wastewater, i.e., from 20 to 5000 mg/l where only 1–1.2 decades of reduction are required. For high concentration influent, several process modules can be serially connected if additional reduction is necessary. In this manner, the BOD can readily be reduced by additional orders of magnitude.

Normally, the relative volume of the aerobic processing zone, as in reactors 32 and 34, is from 3–10 times the volume of the anaerobic vessel 30 and is preferably 6 or 7 times the volume of the anaerobic reactor. The proportional timing for recirculation also favors the path through valve 94 with the valve 92 being open only about 5 minutes every half hour or so in the processing of a typical city wastewater batch. The process normally requires about 3–4 hours to reduce the BOD or COD of the wastewater to a safe level.

Most important, the reactor circulating flow rate is 4–5 times the recycle pumping rate due to the momentum and energy balance of the jet ejectors. The upward flow is sufficient to suspend biological floc, but does not need to be greater than 1 ft/sec to suspend sand and inert solids. This keeps all the reactor zone at high dissolved oxygen concentration and allows settled solids to eject from the bottom at the end of the batch. This saves a lot of energy over conventional systems.

Thus, while the illustrated detailed embodiment of the system shown in the figures includes two aerobic reactors and one anaerobic reactor, this number can vary also as can the size of the reactors. As indicated, if necessary, a plurality of batching systems can be operated in parallel to increase the capacity of the system and, as indicated, plurality of systems can be operated in series to accomplish greater BOD/COD reduction.

After the batch processing is complete, both valves 92 and 94 are closed and the valves 62, 24, 66 and 128 are opened allowing the reactors 30, 32 and 34 to drain and be pumped into the effluent surge tank 108 through line 110.

Prior to emptying, the system pressure is gradually reduced to atmospheric. The air flow is kept the same volumetric flow rate during the pressure reduction, stripping excess gasses dissolved in the water. This is continued for one circulation cycle before discharge, while, at the same time, the system pressure is reduced slowly to atmospheric venting the system vice vapor release tank 46. Effluent is also continuously being pumped at 106 using lines 112 and 114 into concentrator or clarifier 16 where treated water is continuously discharged using weir system 18.

A rather slow reduction in pressure prior to discharge in this system (1–2 atm/min) allows air injected into the recycle stream to strip out dissolved gasses, particularly dissolved $N_2$, more efficiently. Supersaturation of dissolved gasses is eliminated, thus enhancing sludge settling. This decidedly decreases foaming in the system which may otherwise be a problem.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A batch process for treating wastewater in a wastewater treatment system employing anaerobic and aerobic zone reaction vessels under elevated pressure comprising steps of:
    (a) introducing an amount of processed activated sludge material from a source of stored activated sludge into an anaerobic zone of a wastewater treatment system;
    (b) introducing a batch of wastewater to be processed from an inlet supply charge system into the wastewater treatment system including into one or more aerobic zones to provide a charged system;
    (c) closing the inlet supply and pressurizing the charged system by introducing ambient air at high pressure and continuously infusing air and circulating material being treated among anaerobic and aerobic zones as a multiphase bubble flow, and venting an amount of circulated air of reduced oxygen content through a vapor release system thereby controlling system pressure and wherein said material being treated is circulated through said one or more aerobic zones and periodically further circulated through one or more anaerobic zones;

(d) after said material being treated is processed reducing pressure throughout said water treatment system, over a timed interval through said vapor release system; and (e) discharging said batch of wastewater as a treated batch to an effluent storage system for separation of treated water and sludge.

2. A batch process as in claim 1 wherein the volume of aerobic zones is from 3–10 times the volume of anaerobic zones.

3. A batch process as in claim 1 wherein said aerobic zones effectively operate as continuous stirred tank reactors having plug flow circulation.

4. A batch process as in claim 3 wherein the wastewater treatment system includes a plurality of aerobic zones.

5. A batch process as in claim 3 wherein said material being treated resides in an anaerobic zone for about 10 minutes per hour of processing.

6. A batch process as in claim 1 wherein said material being treated resides in an anaerobic zone for about 10 minutes per hour of processing.

7. A batch process as in claim 1 wherein step (c) is carried on from 3–6 hours.

8. A batch process as in claim 1 wherein the activated sludge supplied to the anaerobic zone is of an age to sustain nitrobacteria and nitrosomonas to convert unincorporated ammonia into nitrite.

9. A batch process as in claim 8 wherein said system further converts an amount of said nitrite product into nitrates and thereafter strips $N_2$ therefrom which is removed from said system by vapor discharge.

10. A batch process as in claim 9 wherein, in step (d), wastewater treatment system pressure is reduced at the rate of 1–2 atmospheres per minute.

11. A batch process as in claim 1 wherein, in step (d), wastewater treatment system pressure is reduced at the rate of 1–2 atmospheres per minute.

12. A batch process as in claim 1 wherein air vented in step (c) has an oxygen level of 5–10%.

13. A water treatment system for low cost pressurized treatment of wastewater comprising:

(a) one or more pressure vessels designed to operate under anaerobic conditions;

(b) one or more pressure vessels designed to operate under aerobic conditions;

(c) means for introducing an amount of processed activated sludge material from a source of stored activated sludge into said one or more anaerobic vessels;

(d) means for introducing an amount of wastewater to be processed from an inlet supply system into said one or more aerobic vessels, charged wastewater material to be processed substantially filling all said vessels;

(e) a pressurization and infusion system connected to pressurize and provide fresh air to said system at an elevated pressure by introducing high pressure air and continuously infusing air into said charged system;

(f) a circulating system for continuously circulating charged, air infused material among said aerobic and anaerobic vessels as a multi-phase bubble flow;

(g) a venting system including a vapor release device for continuously venting an amount of circulated air of lower oxygen content to balance air infused by said air compressor; and (h) a system for separating solid and liquid fractions discharged from said processing system.

14. A water treatment system as in claim 13 including circulation directing devices such that the circulation of materials includes circulation through said one or more aerobic vessels and periodically also includes circulation through said one or more anaerobic vessels.

15. A water treatment system as in claim 14 wherein the volume said aerobic vessels is from 4–10 times the volume of said anaerobic vessels.

16. A water treatment system as in claim 14 wherein said aerobic reaction vessels include inlet baffles and jet tubes.

17. A water treatment system as in claim 16 wherein said aerobic vessels operate as continually stirred tank reactors.

18. A water treatment system as in claim 13 wherein said venting system includes a pressure control system for venting to a predetermined controlled pressure.

19. A water treatment system as in claim 13 wherein said venting system further includes a pressure release system for reducing the pressure in said water treatment system at a desired gradual rate.

20. A water treatment system for low cost pressurized treatment of wastewater comprising:

(a) one or more pressure vessels designed to operate under anaerobic conditions;

(b) one or more pressure vessels designed to operate under aerobic conditions;

(c) sludge supply system for introducing an amount of processed activated sludge material from a source of stored activated sludge into said one or more anaerobic vessels;

(d) wastewater supply system for introducing an amount of wastewater to be processed from an inlet supply system into said one or more aerobic vessels, charged wastewater material to be processed substantially filling all said vessels;

(e) a pressurization and infusion system connected to pressurize and provide fresh air to said system at an elevated pressure by introducing high pressure air and continuously infusing air into said charged system;

(f) a circulating system for continuously circulating charged, air infused material among said aerobic and anaerobic vessels as a multi-phase bubble flow;

(g) a venting system including a vapor release device for venting an amount of circulated air of lower oxygen content necessary to balance air infused by said air compressor and to control pressure in said water treatment system; and (h) a system for separating solid and liquid fractions discharged from said processing system.

* * * * *